United States Patent
Zhang et al.

(10) Patent No.: US 10,443,810 B1
(45) Date of Patent: Oct. 15, 2019

(54) DISPOSABLE DUAL WALLS LAMPSHADE INSECT TRAP

(71) Applicants: Fangye Zhang, Frankfort, IL (US);
Yuejie Zhang, Frankfort, IL (US);
Shifang Xu, Frankfort, IL (US)

(72) Inventors: Fangye Zhang, Frankfort, IL (US);
Yuejie Zhang, Frankfort, IL (US);
Shifang Xu, Frankfort, IL (US)

(*) Notice: Subject to any disclaimer, the term of this patent is extended or adjusted under 35 U.S.C. 154(b) by 0 days.

(21) Appl. No.: 16/114,146

(22) Filed: Aug. 27, 2018

(51) Int. Cl.
*F21V 1/12* (2006.01)
*A01M 1/04* (2006.01)
*A01M 1/08* (2006.01)
*A01M 1/14* (2006.01)

(52) U.S. Cl.
CPC .............. *F21V 1/12* (2013.01); *A01M 1/04* (2013.01); *A01M 1/08* (2013.01); *A01M 1/145* (2013.01)

(58) Field of Classification Search
CPC .......... A01M 1/04; A01M 1/08; A01M 1/145; F21V 1/12
See application file for complete search history.

(56) References Cited

U.S. PATENT DOCUMENTS

| | | | | |
|---|---|---|---|---|
| 836,052 A | * | 11/1906 | Pool | 43/113 |
| 2,122,487 A | * | 7/1938 | Pastor | A01M 1/04 362/253 |
| 3,820,273 A | * | 6/1974 | Novak | A01M 1/04 43/113 |
| 6,134,826 A | * | 10/2000 | Mah | A01M 1/04 43/112 |
| 6,786,001 B1 | * | 9/2004 | Piper | A01M 1/04 43/113 |
| 6,886,293 B2 | * | 5/2005 | Forehand | A01M 1/106 43/122 |
| 2018/0035657 A1 | * | 2/2018 | Ots | A01M 1/04 |

FOREIGN PATENT DOCUMENTS

GB        2143112 A   *   2/1985   ............. A01M 1/04

* cited by examiner

*Primary Examiner* — Mariceli Santiago

(57) ABSTRACT

Our invention combines a disposable dual walls lampshade in a specific arrangement to create a space to accommodate the attracting, killing, holding and disposing of insects on a light device. It separates the catching space from the lighting area for keeping a clean lighting. The disposable dual walls lampshade comprises of an internal wall and an external wall, the two walls sealed in bottom edges and has a small open in the top, it forms a one workable piece. All insects will always be caught inside by applied sticky material or chemical agent, insect dead body is trapped in the space between inside of the external wall and outside of the internal wall. Since the dead insects always kept inside the cavity, there is no directly way to touch dead insect, it is safe for children and pets because the special arrangement of the double walls.

6 Claims, 4 Drawing Sheets

DISPOSABLE DUAL WALLS LAMPSHADE INSECT TRAP

CLAIM OF PRIORITY

This application claims priority of U.S. Provisional Patent Application 62/560,139 entitled A Disposable Dual Walls Lampshade Insect Trap, filed Sep. 18, 2017, the teaching of which are incorporated herein by reference.

FIELD OF THE INVENTION

The present invention related to a disposable double walls lampshade for an insect trap, for implementing multiple functions of lure insect, kill, hold (capture), and easy disposition of insects without touching insects' dead body.

BACKGROUND OF THE INVENTION

A lampshade is a fixture that covers the lightbulb on a lamp to diffuse the light it emits. Conical, cylindrical and other forms on floor, desk or table top-mounted as well as suspended lamp models are the most common and are made in a wide range of materials. The term can also apply to the glass hung under many designs of ceiling lamp. Beyond its practical purpose, significant emphasis is also usually given to decorative and aesthetic features. A lampshade can be made of different material such as paper, plastic, glass etc., but it is not intended to create a double walls structure for accommodating insects internal of the lampshade. Everyone want to keep their lampshade shine and clean.

Insect traps are used to monitor or directly reduce populations of insects or other arthropods. They typically use food, visual lures, chemical attractants and pheromones as bait and are installed so that they do not injure other animals or humans or result in residues in foods or feeds. Visual lures use light, bright colors and shapes to attract pests. Chemical attractants or pheromones may attract only a specific sex. Insect traps are sometimes used in pest management programs instead of pesticides but are more often used to look at seasonal and distributional patterns of pest occurrence. The trap mechanism or bait can vary widely. Flies and wasps are attracted by proteins. Mosquitoes and many other insects are attracted by bright colors, carbon dioxide, lactic acid, floral or fruity fragrances, warmth, moisture and pheromones. Synthetic attractants like methyl eugenol are very effective with tephritid flies. Typical of trap types are Light, Adhesive, Terrestrial arthropod, Aquatic arthropod, and Flying insect traps. Many modern traps mixed above technologies, or use fan suck insects into the traps. A durable lampshade is often used to cover the lighting source, but it is not designed to have a dual walls structure for holding insects inside of the lampshade. Insect's dead body may attach to external of the lampshade, or internal. Because dead insects fall into internal of the trap, or around the external of trap, it is very difficult to clean the trap and dispose without seeing or touching the dead bodies. An adhesive trap does stick insect, but it still holds insects in the open, dried adhesive or broken body parts like wings may fall apart. It is difficult to see through an adhesive trap box to checking how many insects are internal. All existing traps are focused on trap and kill the insects with little concern for disposal of the insects' dead body.

By studying the existed insect trap, there are significant flaws such as:
Insect is stuck on an open adhesive tape, dead body or part may fall down during cleaning up and disposal.
or insect stuck inside a close adhesive box, it is difficult to check how may death insects have been trapped to decide when to clean up and dispose.
insects are killed and fall everywhere around the light traps, it is uncomfortable job to clean up and dispose.
Insects are killed and held inside the light trap, it is difficult to clean up and dispose.
There is not a good method of separated lighting from catching space.
Insect trap is not safety to children and pet. Children and pet can touch death insect's body, adhesive material, lures, or chemical agent.

Currently there are no insect traps for providing a disposable dual walls lampshade as a one-time catching and holding tool. No one want to have insects inside their beautiful lampshade. Our invention will revolutionize people's thought process. We want to catch and hold insects in a special garbage bag like device, and then throw away as we do with kitchen waste bag without contaminating our hands. Our invention combines a disposable dual wall lampshade in a specific arrangement to create a space to accommodate the insects for trapping and disposing. The disposable dual wall lampshade is set on a lighting base. The disposable dual walls lampshade comprises of an internal wall and external wall, the two walls connects at the bottom and has a small open in the top to form one functional piece. The external wall, also named as an external half ball, can be made from light material such as plastic, paper, glass etc. It can be opaque, semi-transparent, transparent. There is an open hole in the top of the external wall. Sticky material can be spread on inside of the external wall in factory for catching all flying insects. The internal wall, also named as an internal half ball, can be made from light material such as plastic, paper, glass etc. The top opening will be no bigger than an insect. Some tiny holes may be open in the internal wall for an air path for a fan. The internal wall can be transparent or semi-transparent. Adhesive material can be applied on outside of the internal wall in production for trapping insects. The sticky material will be applied on the insides walls of the lampshade, the adhesive cannot be touched directly from the opening at the top of the dual walls lampshade. The disposable dual walls lampshade will set on a special designed light device that not only provides lighting, but also acts as anchor. The disposable dual walls lampshade separates the lighting from insect catching space for creating a permanent clean and closed space of lighting. The assembly of a double walls lampshade and a light device will be kept in assigned spot. A weighted light device can keep balance and prevent the rollover of a disposable double walls lampshade against wind, pushing.

All insects will be caught by the adhesive inside, their dead bodies will be held within the trap. The double walls lampshade, also named as Fly Ball traps house flies, mosquitos and other flying insects in the home, porch, patio, and garden. Once insects enter the top opening of the lampshade, they will never leave. Even as insects' body decomposes, broken up parts such as wings are held on the inside of the bottom of lampshade, more efficient clean up than fly paper. Nothing will fall on the floor that requires hand cleaning. Our invention demonstrations there is no path for insects to enter the lighting space, i.e., no way to pollute lighting area. Our invention can keep the light device away from contamination by dead insect's body.

To check if there are full of death insects in the lampshade trap, you can check directly from outside if a transparent external wall is adopted. If an opaque or semi-transparent external wall is used, one may take off the dual wall lampshade from the light device, and then check dead insects from looking at the internal wall. Consumers will never touch insects during the entire operation: replacing, loading, applying, checking, and disposing.

The assembled dual walls insect trap can be hang up, plug on a wall, or placed on the ground. Since the dead insects are always kept inside the cavity of the lampshade, there is no directly contact with the dead insect, It is safety for children and pets because the special arrangement of the double external and internal walls prevents insects from falling out or reached by fingers.

Because it is uncomfortable task to look at or touch dead insects, we strongly suggest opaque external wall and transparent internal wall, with external wall colorfully decorated. Users put lure material or killing agent into the cavity of a disposable dual walls lampshade, and then install the disposable dual walls lampshade on a light base that is wired electrical powered or battery powered, turn on the light to attract insects. After a period, take off the disposable dual walls lampshade from the light device, and replace.

Sticky material, lure, chemical agent, lighting device, battery, plugs, switch, etc., are aspects of the insect trap shown as external elements in our invention. A light device can be a battery-operated LED light or alike, or plug on socket. A mini fan can also be installed into the light base for sucking insects. Our invention provides a vehicle to use most of insect killing technologies as lighting, luring, sticking, chemical killing, holding. The dual wall lampshade is not good to use separately without a light device, because you will lose part of the functions such as lighting, position, balance etc.

In conclusion, insofar as we aware, no a lampshade offers the cavity of dual walls as an insect trap to meet consumers' trapping, holding, and disposing of dead insect bodies' needs.

SUMMARY

Our invention combines a disposable dual walls lampshade in a specific arrangement to create a space to accommodate the attracting, killing, holding and disposing of insects on a light device. It separates the catching space from the lighting area for keeping a clean lighting. The disposable dual walls lampshade comprises of an internal wall and an external wall, the two walls sealed in bottom edges and has a small open in the top, it forms a one workable piece. The external wall, also named as an external half ball, can be made from light material such as plastic, paper, glass etc. It can be opaque, semi-transparent, transparent. There is an open hole in the top of the external wall. Sticky material can be spread on inside of the external wall for catching all flying insects in factory. The internal wall, also named as an internal half ball, can be made from light material such as plastic, paper, glass etc. It can be transparent, or semi-transparent. Sticky material can be applied on outside of the internal wall for catching all insects in production. The sticky material always be applied inside of the dual walls lampshade, the sticky material cannot be touched directly from the open hole on the top of the dual walls lampshade. All insects will always be caught inside by applied sticky material or chemical agent, insect dead body is trapped in the space between inside of the external wall and outside of the internal wall. To check if there are full of dead insects, one can check directly from outside if a transparent external wall is adopted. If an opaque or semi-transparent external wall is used, one must take off the dual wall lampshade from the light device, and then check death insects from inside of the internal wall. The assembled dual walls insect trap can be hang up or put on ground. Since the dead insects always kept inside the cavity, there is no directly way to touch dead insect, it is safe for children and pets because the special arrangement of the double walls.

Because it is an uncomfortable task to see or touch dead insects' body, it is our suggestion to adopt an opaque external wall and a transparent internal wall. A user put lure material into the cavity of a disposable dual walls lampshade, and then install the disposable dual walls lampshade on a light base, turn on the light for catching insects. After a period of time, take off the disposable dual walls lampshade from the light device, and then to check if there are many dead insects and the lampshade is in need of replacement. A light base is shown as external elements in our invention, it can be a battery-operated LED light or alike. A mini fan can be installed into the light base for sucking insects.

Sticky material, lure, lighting device, switch, plug etc. are shown as external elements in our invention. We make a few special arrangements in our invention as below:
  a). There is an open hole on the top of the external wall.
  b). There is no hole in the internal wall except having tiny holes for mini fan (if fan is applicable).
  c). The external wall and internal wall connects along the bottom edges for forming a space.
  d). The combination of the external wall and internal wall as a functional lampshade is put on a light device. It not only provides a trapping function, but also keeps death insects inside forever. The dual walls lampshade provides a full cover to the light device, no insect can approach to the lighting.
  e). The lighting device not only provide lighting, but also act as anchor of the dual walls lampshade.

All of parts forms a closed system that act as an insect trap for attracting, killing, holding, and isolating the insect death body for easy and clean disposing without contamination.

DRAWINGS

DETAILED DESCRIPTION

Figure 1:
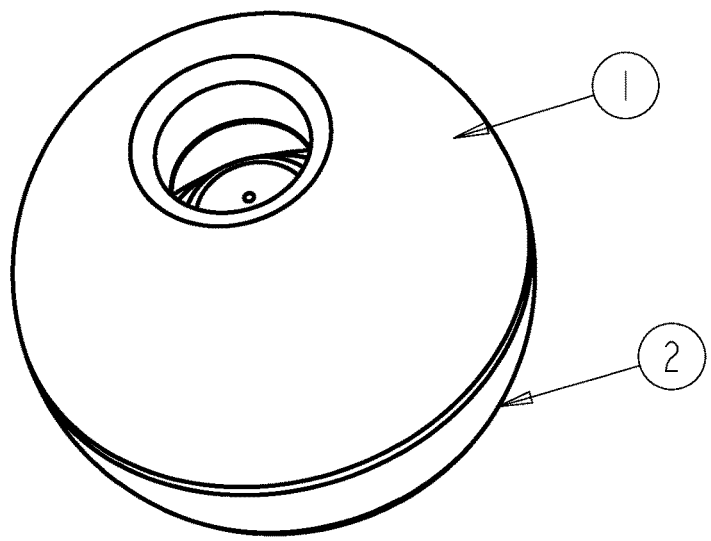
FIG. 1 is a perspective view of a disposable dual walls lampshade and a light device.

FIG. 1 is a perspective view of a disposable dual walls lampshade 1 and a light device 2, it comprises the Disposable Dual Walls Lampshade 1, and a Light Device 2 in all closed situation for operation. There is an open hole in the top of the lampshade 1.

Figure 2:
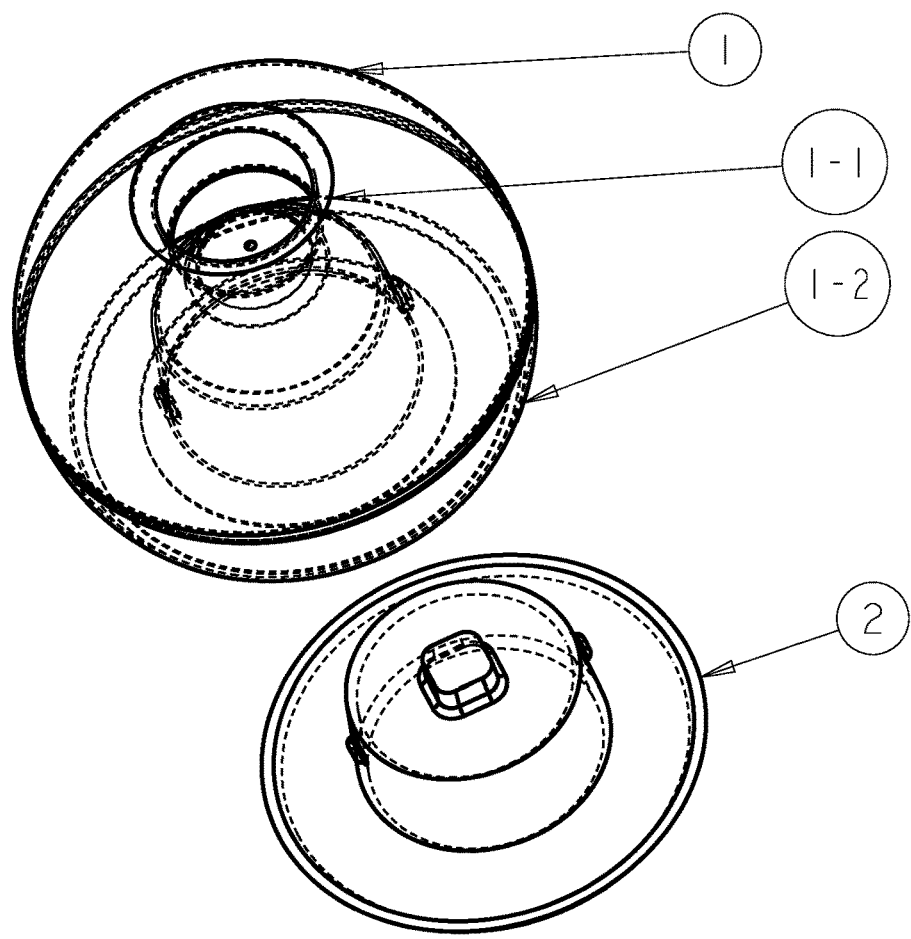
FIG. 2 is disassemble view of a disposable dual walls lampshade and a light device.

FIG. 2 is a disassemble view of a disposable dual walls lampshade 1 and a light device 2. It shows how to assembly, or disassemble the insect trap. There is an open hole at the top of the external wall 1-1, or named as external half ball 1-1.

Figure 3:
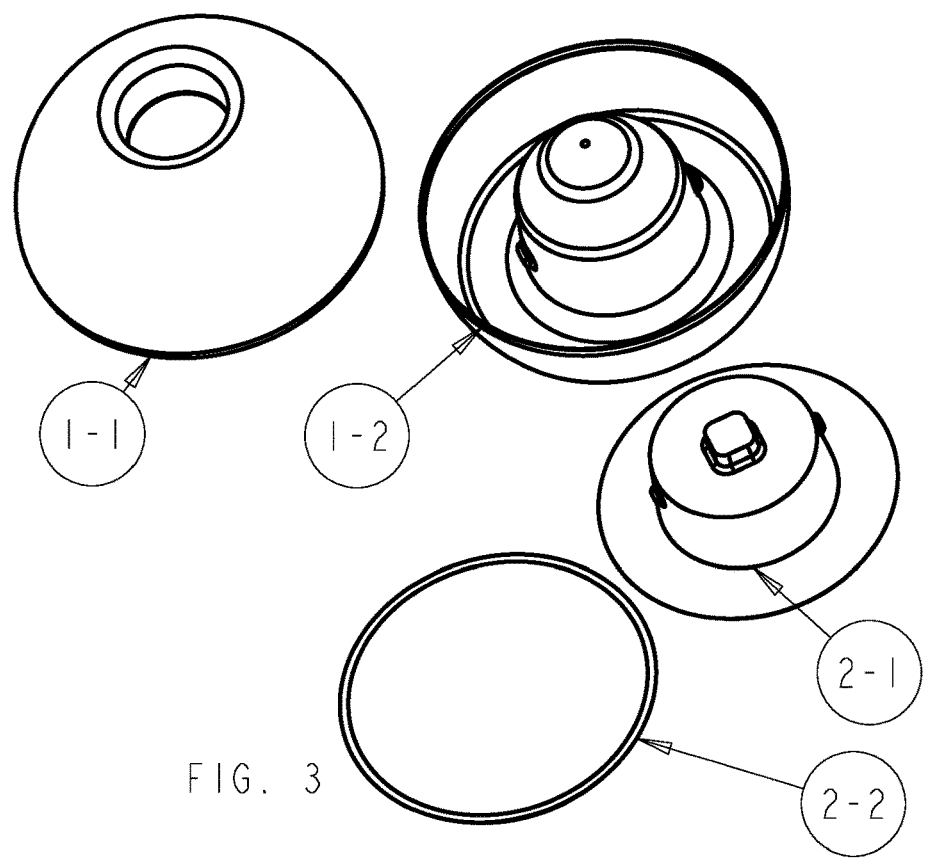
FIG. 3 is disassemble view of an opened external wall (external ball) and an internal wall (internal ball) of a disposable dual walls lampshade, and an opened light part and a light base of a light device.

FIG. 3 is a disassemble view of an opened external wall (external ball) 1-1 and an internal wall (internal ball) 1-2 of a disposable dual walls lampshade 1, and an opened light part 2-1 and a light base 2-2 of a light device 2. There is an open hole at the top of the external wall 1-1 for insect flying in. The internal wall 1-2 looks like a bowel for accommodating insects. The internal wall 1-2 can be clipped by the light device 2.

Figure 4:
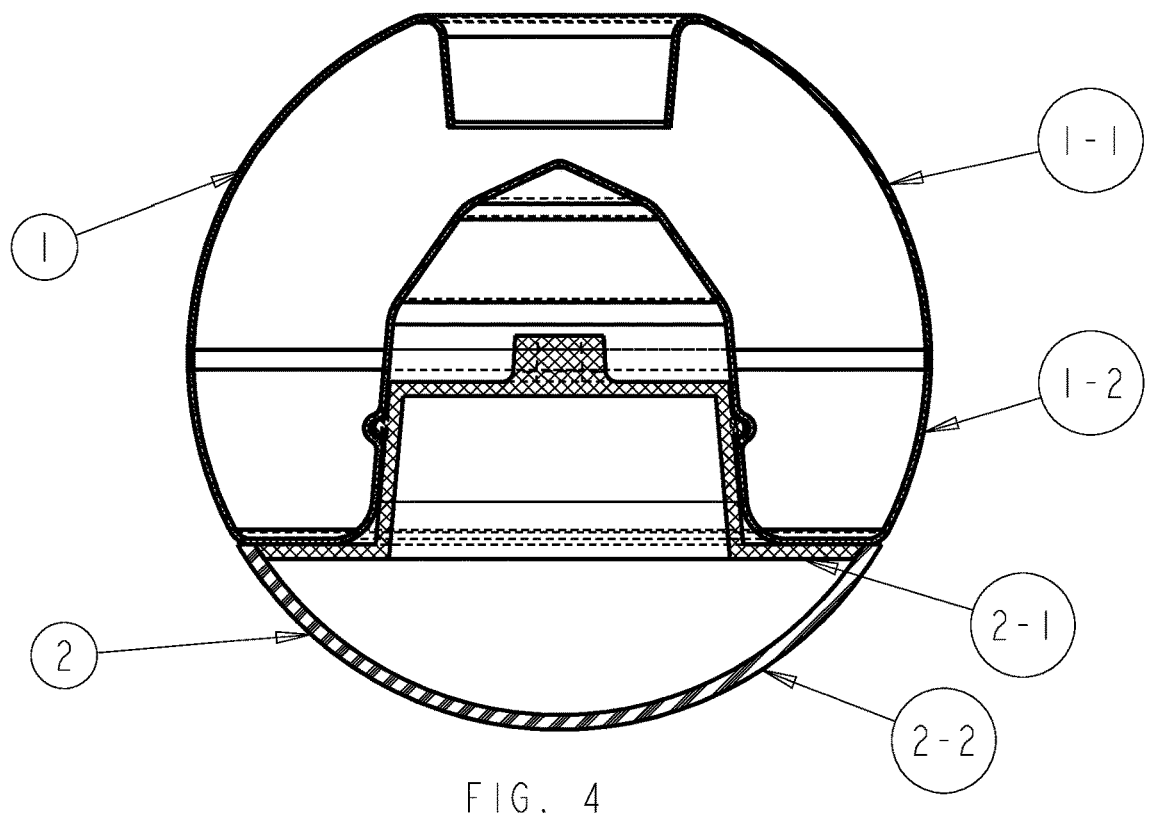
FIG. 4 is a cross section view of the external wall (external ball) and internal wall (internal ball) of a disposable dual walls lampshade, and a light part and a light base of a light device.

FIG. 4 is a cross section view of the external wall 1-1 (external ball) and internal wall 1-2 (internal ball) of a disposable dual walls lampshade 1, and a light part 2-1 and a light base 2-2 of a light device 2. It shows the entrance and room for insects. It also shows the space for lamp and battery.

Figure 5:
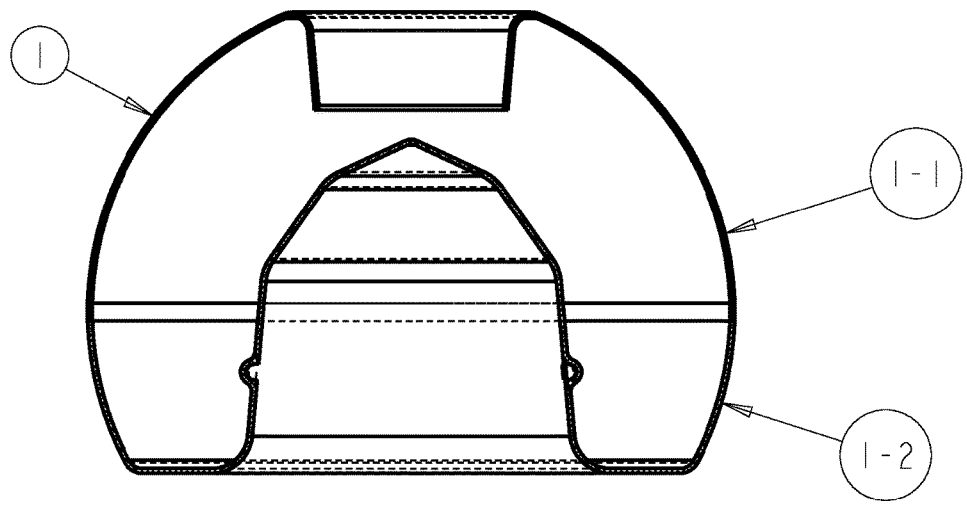
FIG. 5 is a cross section view of the external wall (external ball) and the internal wall (internal ball) of a disposable dual walls lampshade.

FIG. 5 is a cross section view of the external wall 1-1 (external ball) and the internal wall 1-2 (internal ball) of a disposable dual walls lampshade 1. It shows where insects can fly into the cavity. It shows how death insect boy is hold inside of the lampshade 1. It shows where is no path for insects to enter the lighting space, no way to pollute lighting area.

Figure 6:
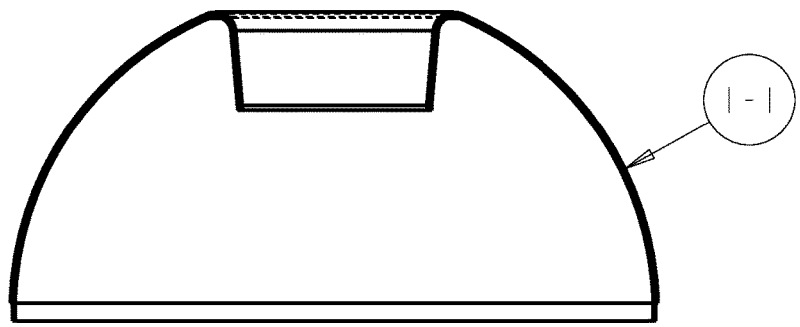
FIG. 6 is a cross section view of the external wall (external ball) of a disposable dual walls lampshade.

FIG. 6 is a cross section view of the external wall 1-1 (external ball) of a disposable dual walls lampshade. There is a hole on the top of the external wall 1-1.

Figure 7:
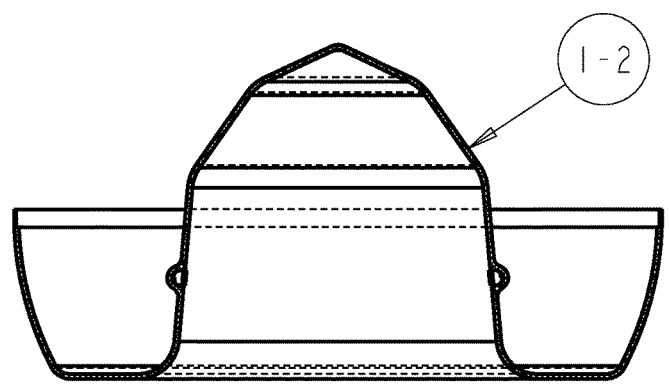
FIG. 7 is a cross section view of the internal wall (internal ball) of a disposable dual walls lampshade.

FIG. 7 is a cross section view of the internal wall 1-2 (internal ball) of a disposable dual walls lampshade 1. The outside space is for insect, and inside space is for light.

Figure 8:
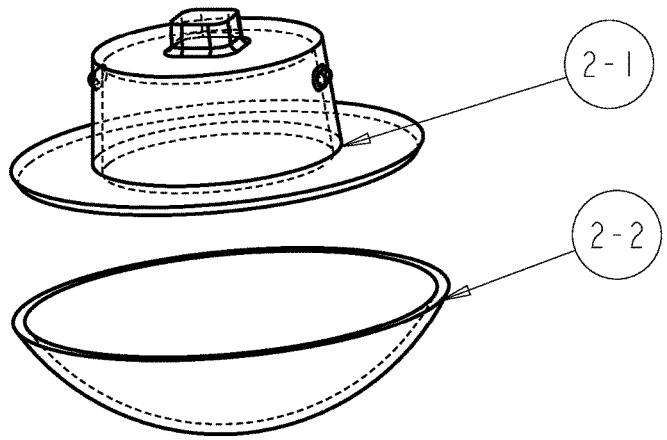
FIG. 8 is disassemble view of a light part and a light base of a light device.

FIG. 8 is a disassemble view of a light part 2-1 and a light base 2-2 of a light device 2. It shows a basic structure for light and battery.

Figure 9:
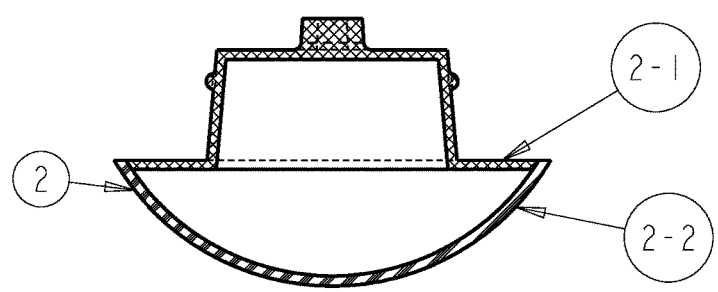
FIG. 9 is a cross section view of a light part and a light base of a light device.

FIG. 9 is a cross section view of a light part 1-1 and a light base 2-2 of a light device 2. There is room for batteries.

Figure 10:
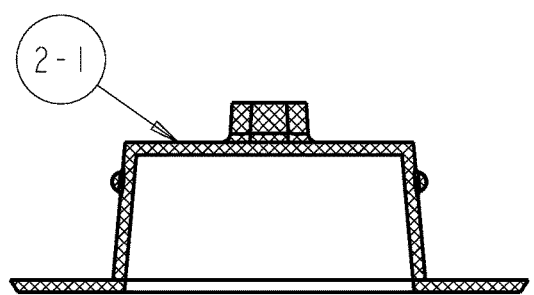
FIG. 10 is a cross section view of a light part of a light device.

FIG. 10 is a cross section view of a light part 2-1 of a light device 2.

Figure 11:
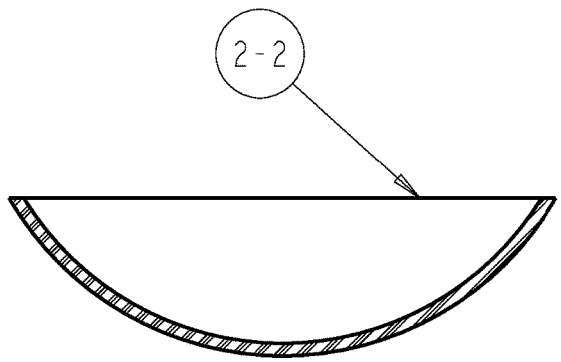
FIG. 11 is a cross section view of a light base of a light device.

FIG. 11 is a cross section view of a light base 2-2 of a light device 2.

REFERENCE NUMBER

A disposable dual walls lampshade
   1-1 An external wall (external half ball)
   1-2 An internal wall (internal half ball)
2 A light device
   2-1 A light part
   2-2 A light base

OPERATION

An external wall (external half ball) 1-1 and an internal wall (internal half ball) 1-2 are assembled as one piece of the disposable dual walls lampshade 1. A light part 2-1 and a light base 2-2 are also assembled as one piece of the light device 2. Some lures are loaded into the cavity of a disposable double walls lampshade 1, and then a loaded lampshade 1 is put on the light device 2, turn on light for operation. To check the level of insect death body and decide to replace a lampshade. To take off a filled dual walls lampshade, and throw into a waste bin.

(1) To put some lure into the cavity between the external wall (external ball) 1-1 and the internal wall (internal ball) 1-2 of a new disposable dual walls lampshade 1.

(2) To put the loaded new disposable dual walls lampshade 1 on a light device 2 for a firm connecting and required placement.

(3) If an opaque or semi-transparent external wall 1-1 is used, one must take off the dual wall lampshade 1 from the light device 2, and then check death insects from internal of the internal wall 1-2.

(4) if a transparent external wall 1-1 is adopted, to check the level of death insects from the external of the external wall 1-1 directly without taking off from the light device 2.

(5) To take off a filled dual walls lampshade 1 from the light device 2 if there are a lot of death insect's body.

(6) To throw away the filled dual walls lampshade 1.

The invention claimed is:

1. A lampshade, comprising:
a first portion that has a hemispherical shape and includes an opening formed therethrough that is centered on a high point of the first portion; and
a second portion that is shaped and sized to assemble to the first portion at an outer periphery thereof and shaped and sized to define a first space therebetween, the second portion including an annular trough and an arched dome portion formed central to the annular trough, the dome extending toward the opening and having an axis that is coincident with the opening, the dome sized to house a light-producing element therewithin.

2. The lampshade of claim 1, wherein the opening includes a funnel shaped sidewall extending into the first space.

3. The lampshade of claim 1, wherein the arched dome portion extends into the first portion.

4. The lampshade of claim 1, wherein the dome portion defines a second space that is isolated from the first space.

5. The lampshade of claim 1, further comprising a light part that is configured to span the bottom of the dome portion to close the second space.

6. The lampshade of claim 5, further comprising a base having a bowl shape that is configured to attach to the light part.

* * * * *